(12) United States Patent    (10) Patent No.: US 7,673,298 B2
Oyama    (45) Date of Patent: Mar. 2, 2010

(54) SOFTWARE OBJECT VERIFICATION METHOD FOR REAL TIME SYSTEM

(75) Inventor: Hiroshi Oyama, Aichi (JP)

(73) Assignee: Okuma Corporation, Aichi (JP)

( * ) Notice: Subject to any disclaimer, the term of this patent is extended or adjusted under 35 U.S.C. 154(b) by 1166 days.

(21) Appl. No.: 11/175,541

(22) Filed: Jul. 6, 2005

(65) Prior Publication Data

US 2006/0015592 A1    Jan. 19, 2006

(30) Foreign Application Priority Data

Jul. 15, 2004    (JP) .............................. 2004-209056

(51) Int. Cl.
*G06F 9/44* (2006.01)
*G06F 9/445* (2006.01)

(52) U.S. Cl. ........................ 717/168; 717/169; 717/170; 717/171; 717/173; 717/174; 717/175; 717/176; 717/178; 713/189; 726/24; 726/23; 714/38

(58) Field of Classification Search ......... 717/168–171, 717/173–176, 178; 713/189; 726/24, 23; 714/38
See application file for complete search history.

(56) References Cited

U.S. PATENT DOCUMENTS

| | | | | |
|---|---|---|---|---|
| 5,815,571 A | * | 9/1998 | Finley | ........................ 713/189 |
| 5,909,544 A | * | 6/1999 | Anderson et al. | ............ 717/178 |
| 5,974,567 A | * | 10/1999 | Dickson et al. | .............. 713/100 |
| 6,199,204 B1 | * | 3/2001 | Donohue | ..................... 717/178 |
| 6,202,207 B1 | * | 3/2001 | Donohue | ..................... 717/173 |
| 6,598,223 B1 | * | 7/2003 | Vrhel et al. | .................. 717/174 |
| 6,633,912 B1 | * | 10/2003 | Welter et al. | ................. 709/224 |
| 7,143,391 B1 | * | 11/2006 | Guo | ............................ 717/178 |
| 2002/0035696 A1 | * | 3/2002 | Thacker | ...................... 713/200 |
| 2002/0188941 A1 | * | 12/2002 | Cicciarelli et al. | ........... 717/175 |
| 2003/0037327 A1 | * | 2/2003 | Cicciarelli et al. | ........... 717/178 |
| 2005/0102580 A1 | * | 5/2005 | House et al. | ................... 714/38 |
| 2006/0150174 A1 | * | 7/2006 | Abe et al. | .................... 717/168 |

OTHER PUBLICATIONS

Whitson, G. "Computer Security: Theory, Process and Management", 2003, CCSC, pp. 57-66.*

* cited by examiner

*Primary Examiner*—Qamrun Nahar
(74) *Attorney, Agent, or Firm*—Gauthier & Connors LLP (57) ABSTRACT

Before applying a software object such as virus detecting software to a customer's real time control apparatus, in order to verify an effect on real time control of the software object, the software object is downloaded from a first web site to a verifying real time control apparatus, and the software object is applied to the verifying real time control apparatus to evaluate whether the customer's real time control apparatus stably maintains the real time control or not. The software object which has been evaluated as one capable of maintaining a stability is uploaded to a second web site, and made to be applicable to the customer's real time control apparatus. Moreover, an observation computer observes whether the verification is performed normally or not.

12 Claims, 10 Drawing Sheets

SOFTWARE OBJECT VERIFICATION METHOD FOR REAL TIME SYSTEM

PRIORITY INFORMATION

This application claims priority to Japanese Patent Application No. 2004-209056, filed Jul. 15, 2004, which is incorporated herein by reference in its entirety.

BACKGROUND OF THE INVENTION

1. Field of the Invention

The present invention generally relates to a software object verification method for a real time system such as a control apparatus realized by a computer to performing real time control, and more particular to a method of realizing an update of software safely by evaluating influences to real time control by software objects such as computer virus detecting software, a detection pattern file and updating software to basic software when the software objects are applied.

2. Description of the Related Art

Personal computer (PC)-based control apparatuses have begun to spread with the spread of PCs today. For PCs there is an abundance of applications for production management, designing, automatic programming and the like, and they are available for promoting the introduction of IT in a working site. However, networks have spread, and computer viruses aiming at PCs as targets of attacks have become an everyday affair, so much so that computer viruses are now a serious social issue. PCs located on processing sites are no exception to being objects of computer viruses, and PCs are in the situation of being obliged to take prompt measures against computer viruses.

However, for taking the anti-virus measures in a control apparatus performing real time control, because data influencing the software or the operation of a stably operating system is to be updated, the reliability of control could be impaired if the anti-virus measures are applied without confirming that the operation of the control apparatus is not hindered by examining whether the anti-virus measures influence real time performances of the control apparatus or not.

For example, in the main system in an enterprise, when a fault occurs in the system, enterprise activities are affected. Accordingly, it is natural that even a minor software update should be applied after a careful prior examination. In a real time control apparatus, although the influences differ from those in the main system, there is the possibility that an abnormal operation of software may lead to the occurrence of an accident. Accordingly, even a minor software update should be carefully examined in advance like in the main system.

Software objects such as computer virus detecting software, detection pattern files and updating software of basic software are frequently issued, and evaluation must be conducted without delay to ensure that the software objects operate without any problems in real time control applicable to customer's real time control apparatuses. If there is a delay, there is the possibility that a computer virus will infect a real time control apparatus during the delay, and exert a bad influence on the real time control thereof. On the other hand, when a situation of applying an unsuitable software object having some problems to a real time control apparatus occurs, many customers' real time control apparatuses start to operate abnormally, and significant cost is needed to restore the real time control apparatuses.

However, because it requires a lot of labor to apply software objects after fully conducting such examinations, the following problems have been caused. That is, the examination cost increases, and objective and adequate evaluation criteria of operations are not clear, which makes it impossible to perform necessary and sufficient verification.

The present invention was made in view of the problems mentioned above. The present invention verifies the influences of a software object such as virus detecting software, a detection pattern file and the updating software of basic software on real time control before applying the software object to a customer's real time control apparatus.

It is an advantage of the present invention to provide a software object verification method for a real time system capable of performing verification of a software object more quickly.

SUMMARY OF THE INVENTION

A software object verifying method for a real time system according to the present invention is a method for verifying an effect of a software object on real time control before applying the software object to a customer's real-time control apparatus, including the steps of: downloading the software object from a first web site to a verifying real time control apparatus realized by a computer system for performing the real time control; applying the software object to the verifying real time control apparatus; evaluating whether the verifying real time control apparatus stably maintains the real time control or not even after the software object is applied to the verifying real time control apparatus; uploading the software object which has been evaluated as one capable of maintaining stability to a second web site; and the customer's real time control apparatus downloading the software object from the second web site to enable the software object to be applied.

Moreover, a method includes the steps of: downloading the software object from a first web site to a verifying real time control apparatus realized by a computer system for performing the real time control; applying the software object to the verifying real time control apparatus; evaluating whether the verifying real time control apparatus stably maintains the real time control or not; uploading a result of the evaluation to a second web site; and the customer's real time control apparatus enabling the software object to be applied based on the result of the evaluation uploaded to the second web site.

Moreover, the method is preferably one wherein an observation computer observes the verifying real time control apparatus, and, when the verifying real time control apparatus is disabled and cannot output any evaluation results, the observation computer reports the situation to a manager terminal at each of the steps of: downloading the software object from the first web site to the verifying real time control apparatus; applying the software object to the verifying real time control apparatus; evaluating whether the verifying real time control apparatus stably maintains the real time control or not; and uploading at least one of the software object after the evaluation and a result of the evaluation to a second web site.

Moreover, the method is preferably one further comprising the step of evaluating that a time margin of the real time task operating in the verifying real time control apparatus is not below a predetermined value in a state in which the software object is applied under a predetermined load is imposed on the verifying real time control apparatus to be operated for a predetermined time for.

Moreover, the method is preferably one wherein the verifying real time control apparatus is a numerically controlled apparatus, further comprising the step of evaluating that program interpretation is performed to be in time for function generation in a state in which a predetermined part program is interpreted and is executed by the numerically controlled apparatus to.

Moreover, the method is preferably one wherein the software object includes at least one of virus detecting software, a detection pattern file and anti-virus software for protection from computer viruses.

Moreover, the method is preferably one wherein the software object is software for updating basic software.

According to the configuration mentioned above, the software object located at the first web site is first downloaded to the verifying real time control apparatus performing the real time control, and the propriety of application of the software object is judged. Here, the software object means, for example, virus detecting software, a detection pattern file, an update file of basic software including an anti-virus measure, or the like. A supplier of the software objects such as a supplier of anti-virus software and a supplier of basic software locate the software objects at the first web site which, for example, the supplier sets up himself or herself, and the software objects are, for example, automatically downloaded to the verifying real time control apparatus. Then, the software object is operated for a predetermined time on the verifying real time control apparatus, and thereby the propriety of the application of the software and the pattern file is judged based on an objective evaluation judgment standard. Consequently, when the software and the pattern file are applied to the real time control apparatus, it is possible to verify for a short time whether the real time control is stably maintained or not.

Moreover, when the software and the pattern file are judged to be applicable, the software, the pattern file or a judgment result is uploaded to the second web site, and it becomes possible to be applied to the customer's control apparatus. Here, the second web site can be set up by, for example, a person who subjectively wants to implement the method of the present invention. Consequently, an anti-virus measures can be completed within a short period of time from the finding of a virus.

Moreover, the verifying real time control apparatus is assisted and observed by the observation computer, and it is observed that the above-mentioned verification is normally performed. When it is detected that the normal verification is not performed, the observation computer reports the fact to the manager's terminal or the like, for example, by transmitting mail. Consequently, when the verification is not performed normally, the occurrence of the problem is immediately informed to the manager's terminal or the like. Thus, the informed manager's terminal or the like can deal with the problem without delay.

Moreover, because the effects on the real time control are objectively judged as the timing margin, strict judgment can be made in a short time, and it can be clearly shown that there are no effects on the real time control. Consequently, a user (customer) of the real time control apparatus can apply the software and the pattern file without anxiety.

Moreover, when the real time control apparatus is the numerically controlled apparatus, a predetermined part program is interpreted and executed by the numerically controlled apparatus, and it is evaluated that the program interpretation is, for example, always in time for the function generation. Consequently, the user (customer) of the numerically controlled apparatus does not need to worry about variation of the performance of the numerically controlled apparatus causing deterioration in the degree of surface roughness of a processing surface by the application of the software or the pattern file.

BRIEF DESCRIPTION OF THE DRAWINGS

A preferred embodiment of the present invention will be described in detail based on the following drawings, wherein.

DETAILED DESCRIPTION OF PREFERRED EMBODIMENTS

Figure 1:
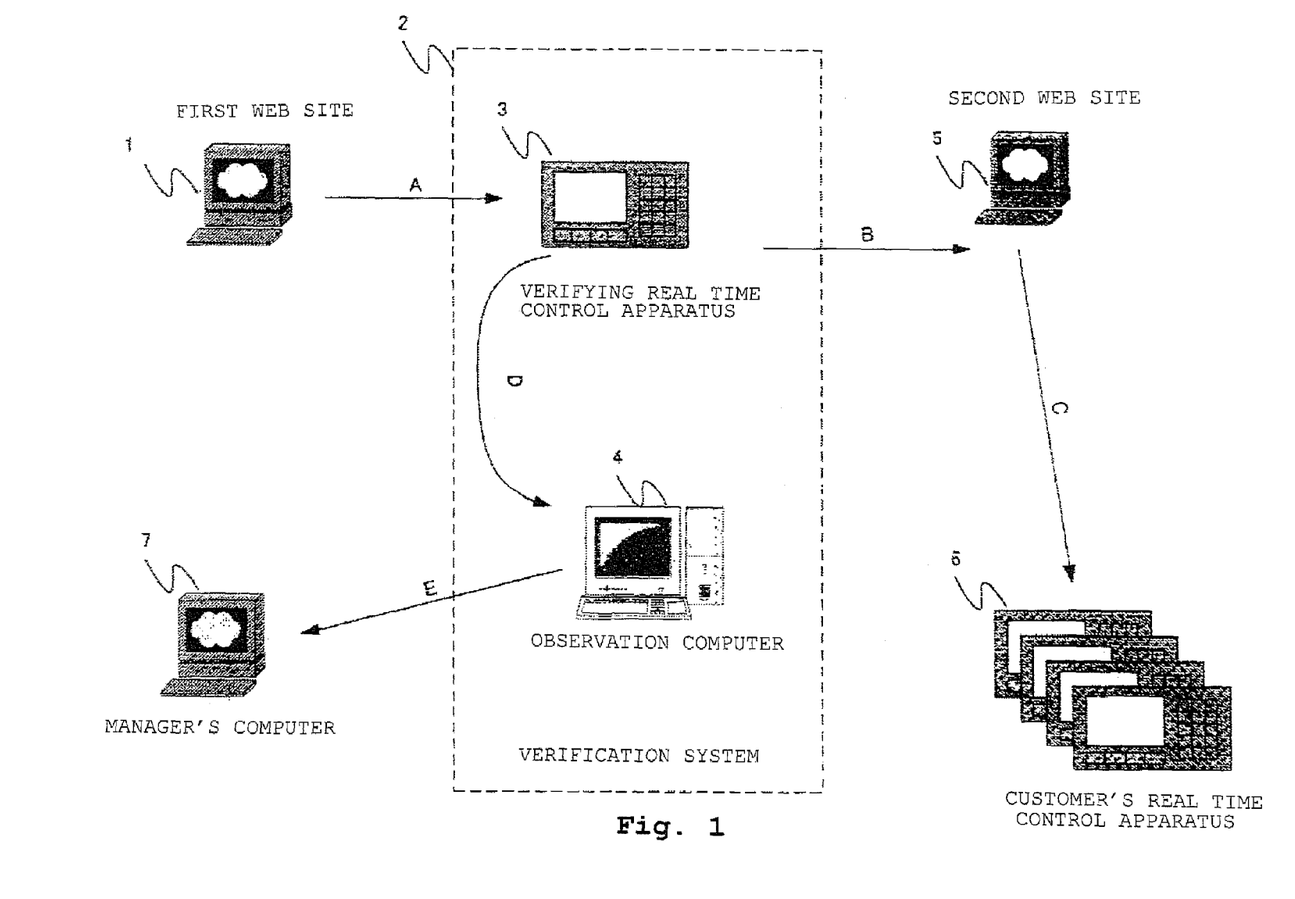
FIG. 1 is a view showing the outline of the whole system to which a protection method against a computer virus for a real time system and a software updating method can be applied in an embodiment according to the present invention.

Hereinafter, a software object verification method for a real time system in an embodiment according to the present invention is described with reference to the attached drawings. FIG. 1 is a view showing the outline of the whole system to which a protection method against a computer virus and a software updating method for a real time system can be applied. A first web site 1 is a web site which a supplier of virus detecting software or basic software sets up. If the supplier of the first web site 1 is the virus detecting software supplier, the supplier uploads the virus detecting software or a virus detection pattern file to the first web site 1. If the supplier of the first web site 1 is the basic software supplier, the supplier uploads updating software to the first web site 1. Thereby, the suppliers make it possible for a user to download those items of software or the file immediately from the first web site 1 through the Internet. Consequently, the user can take measures against viruses and measures against problems quickly. Incidentally, a simple expression of "software object" is hereinafter meant to indicate virus detecting software, a virus detection pattern file and updating software.

A verification system 2 is a system playing the central role in the present invention, and the verification system 2 is set up by a person who performs the service of judging the propriety of the application of a software object to the customer's real time control apparatus 6. In many cases, the verification system 2 should be set up by the supplier of the customer's real time control apparatus 6. A verifying real time control apparatus 3 downloads a software object from the first web site 1 (flow A), and takes a predetermined time to automatically verify that the downloaded software object has no problems on performing real time control and that the real time control can be maintained stably. When the verifying real time control apparatus 3 confirms that the software object has no problems, the verifying real time control apparatus 3 uploads the software object to a second web site 5 (flow B). The customer's real time control apparatus 6 downloads the uploaded software object from the second web site 5 (flow C), and applies it. As a result, the updating of the virus detecting software, the virus detection pattern file and the updating software of the customer's real time control apparatus 6 is performed quickly, with the stable operation of the customer's real time control apparatus 6 being guaranteed.

Moreover, there is some possibility that the verifying real time control apparatus 3 does not function at all to make it impossible to perform verification by the application of the software object. In this case, the verifying real time control apparatus 3 can be in the state where it cannot even notify the fact in such a situation to others, because it has become disabled. Accordingly, the verifying real time control apparatus 3 reports start of verification and completion of the verification to an observation computer 4 (flow D). The observation computer 4 observes the start and the end of verification of the verifying real time control apparatus 3. If the verification is not started in a predetermined time, or if the verification is not completed within the predetermined time even if the verification has been started, the observation computer 4 transmits mail informing the detection of a time-out error to a manager's computer 7 to notify the occurrence of an abnormality to a manager.

Next, the verifying real time control apparatus 3 is described. Here, a numerically controlled apparatus, one kind of real time control apparatus, is exemplified and described.

Figure 6:
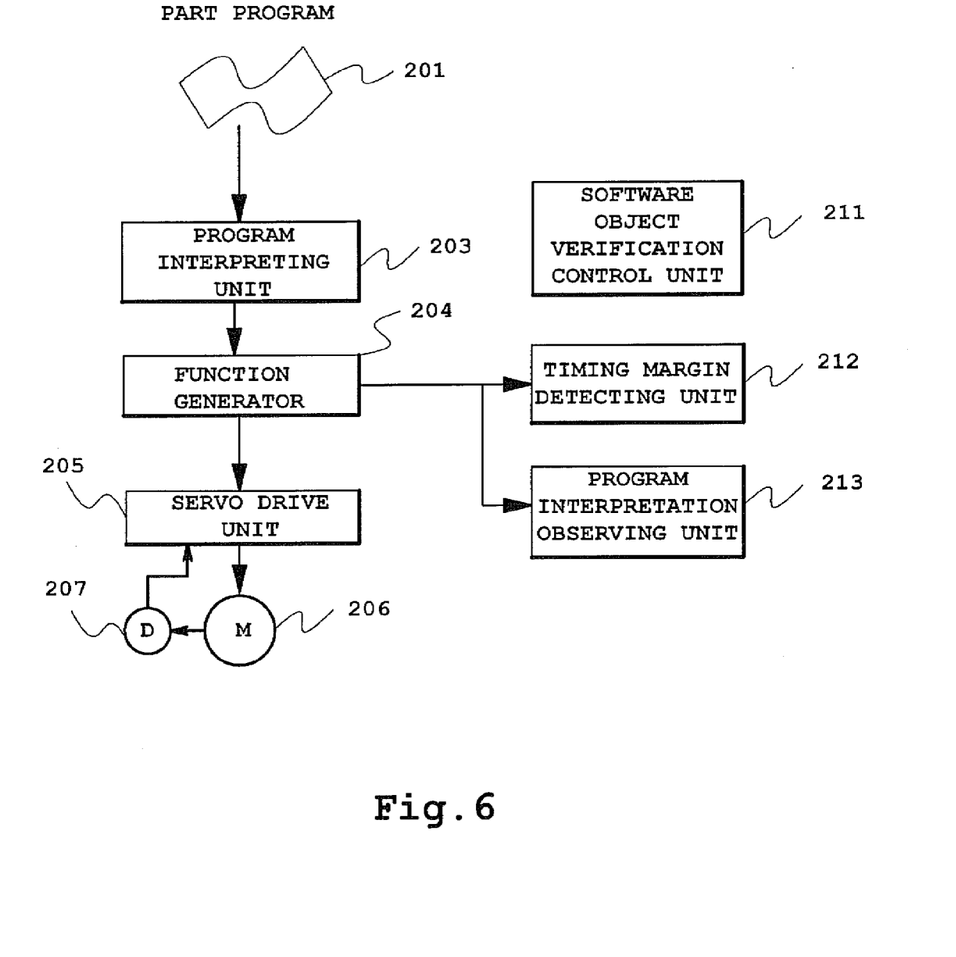
FIG. 6 is a configuration diagram of the numerically controlled apparatus in the embodiment according to the present invention.

FIG. 6 is a configuration diagram of the numerically controlled apparatus. The interpretation of a part program is sequentially performed by a program interpreting unit 203 of FIG. 6. Then, based on a result of the program interpretation, the function generator 204 performs function generation at every constant period. Then, a servo drive unit 205 is driven according to a function generation result, and a servomotor 206 is driven, receiving feedback from a position detector 207. Thus, the position control of a motor drive axis and the like is performed. Incidentally, a software object verification control unit 211, a timing margin detecting unit 212 and a program interpretation observing unit 213 are elements peculiar to the verifying real time control apparatus 3, and are elements unnecessary for the customer's real time control apparatus 6. Moreover, as for the elements other than those mentioned above, both of the verifying real time control apparatus 3 and the customer's real time control apparatus 6 generally have the same elements. The elements peculiar to the verifying real time control apparatus 3 will be described later in detail.

Figure 5:
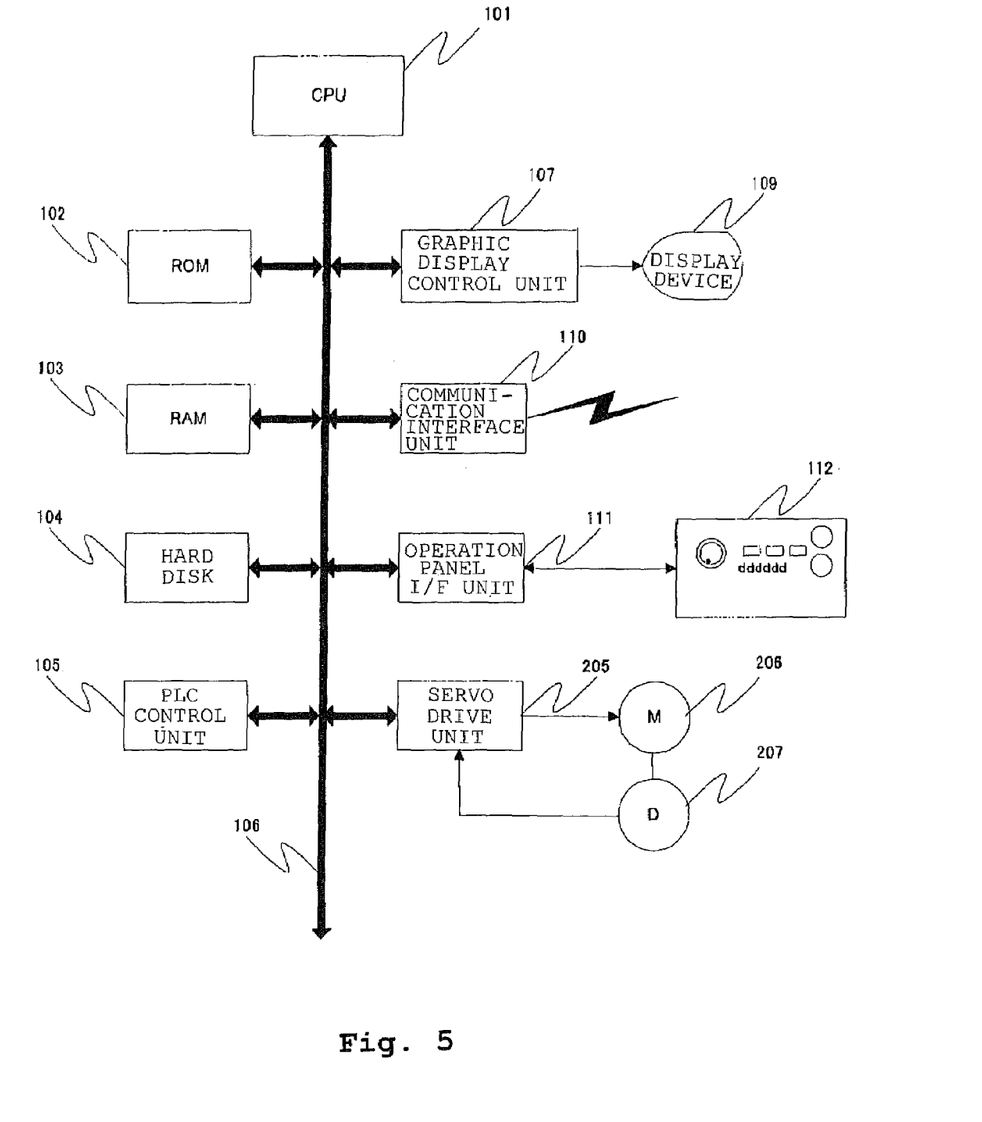
FIG. 5 is a block diagram showing a computer system realizing a numerically controlled apparatus in the embodiment according to the present invention.

The numerically controlled apparatus as shown in FIG. 6 is practically realized by a computer system having a block diagram shown in FIG. 5. The computer system shown in FIG. 5 is equipped with a CPU 101 as the center of the system, memories composed of a ROM 102 and a RAM 103, and a hard disk 104 as an auxiliary storage device. Then, the computer system can communicate with other computers and web sites on the Internet through a communication interface unit 110. In addition, the computer system is composed of a PLC control unit 105, a graphic display control unit 107 controlling a display device 109, an operation panel I/F unit 111 being an interface circuit with an operation panel 112, the servo drive unit 205, the servo motor 206, the position detector 207 and the like. Incidentally, the same elements as those shown in FIG. 6 are denoted by the same symbols as those in FIG. 6. Although not shown in FIG. 5, the computer system is under multitasking control by a real time OS, and the program interpreting unit 203 and the function generator 204 of the numerically controlled apparatus of FIG. 6 are realized as a different kind of task each other.

Figure 7:
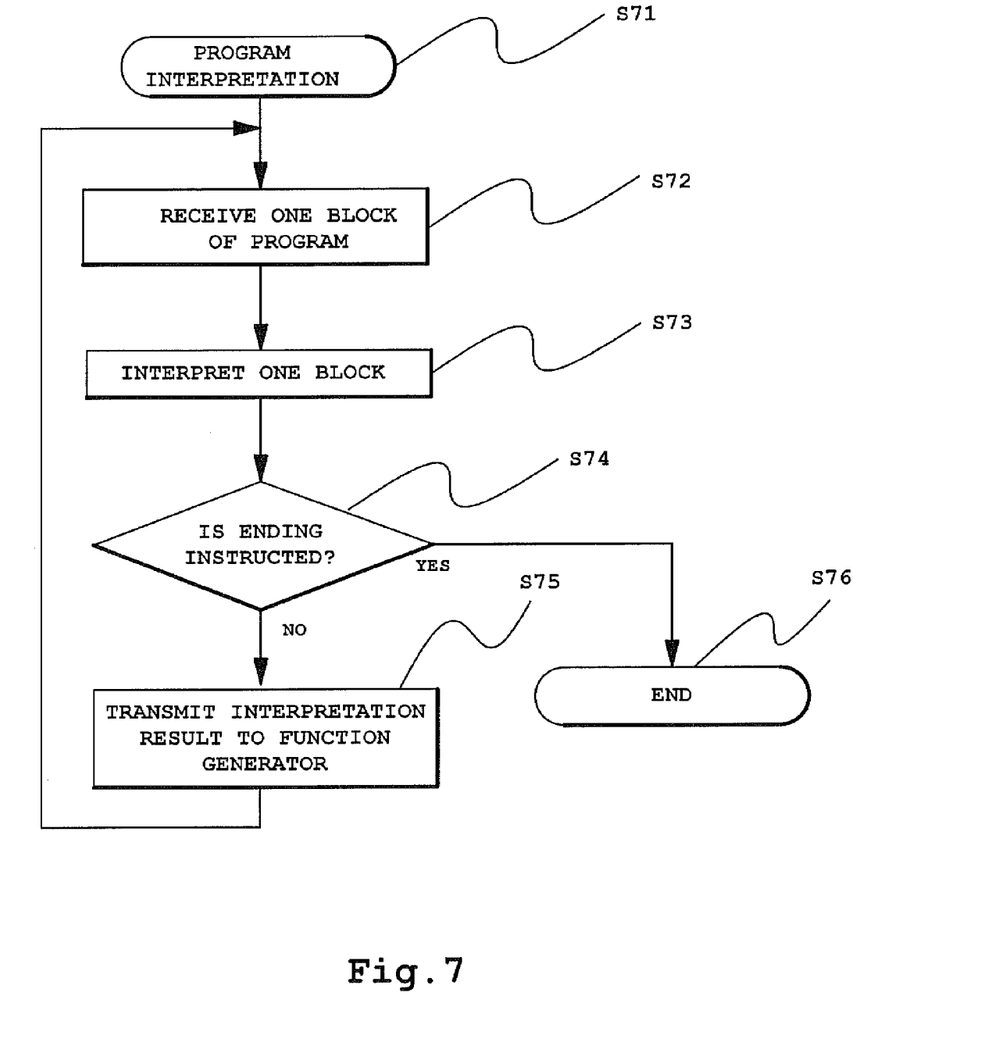
FIG. 7 is a flowchart showing the operation of a program interpreting unit in the embodiment according to the present invention.
Figure 8:
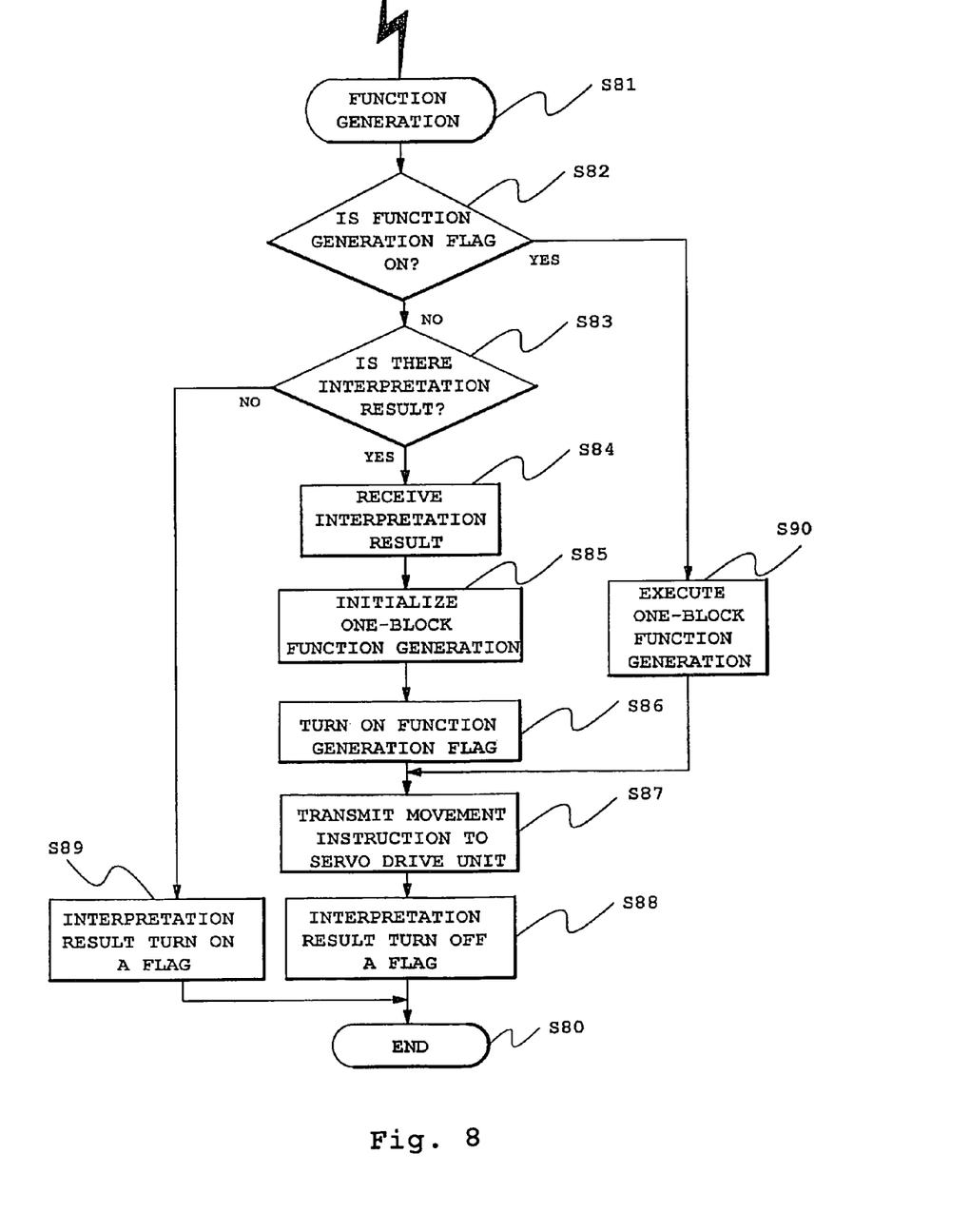
FIG. 8 is a flowchart showing the operation of a function generator in the embodiment according to the present invention.

The operations of the program interpreting unit 203 and the function generator 204, which are the centers of real time control or numerical control, are described here using the flowcharts of FIGS. 7 and 8.

FIG. 7 is a flowchart showing the operation of the program interpreting unit 203. When the part program of the numerically controlled apparatus is started, the program interpreting unit 203 starts a program interpretation operation (Step S71), and receives one block of the part program (Step S72). Then, the program interpreting unit 203 interprets the received one block (Step S73), and judges whether the block instructs an end by M02 (end of program) or not (Step S74). When the block is the end instruction, the program interpreting unit 203 ends the operation thereof (Step S76). Otherwise, the program interpreting unit 203 transmits the result of the interpretation to the function generator 204 (Step S75). Then, the processing of the program interpreting unit 203 returns to Step S72, and the program interpreting unit 203 repeats the processes of from Step S72 to Step S75.

FIG. 8 is a flowchart showing the operation of the function generator 204. The function generator 204 is started at every predetermined period of time Tcyc, and is set to end the processing thereof within a predetermined time. First, the processing is started at every predetermined period of time Tcyc (Step S81). When a function generation flag is not turned on (Step S82), the function generator 204 judges whether there is any interpretation result or not, namely whether an interpretation result transmitted from Step S75 of the processing of the program interpreting unit 203 exists or not (Step S83). When there is no interpretation result, the function generator 204 turns on a flag according to an interpretation result (Step S89), and ends its operation (Step S80). When there is an interpretation result at Step S83, the function generator 204 receives the interpretation result (Step S84), and performs one-block function generation initialization (Step S85). In the one-block function generation initialization, for example, in the case of a G00 instruction (rapid feed) or in the case of a G01 instruction (cutting feed), the function generator 204 calculates and stores a distance to a target position and a movement distance of each axis at each predetermined period of time Tcyc up to the target position (Step S85). Then, the function generator 204 turns on the function generation flag (Step S86). Subsequently, the function generator 204 transmits a movement instruction for a first definite period of time Tcyc to the servo drive unit 205 (Step S87), and according to the interpretation result, turns off a flag (Step S88). Then, the function generator 204 ends the processing for each predetermined period of time Tcyc (Step S80).

Moreover, when the function generation flag is turned on at Step S82, the function generator 204 executes one-block function generation (Step S90). In the one-block function generation, in the case of the G00 instruction or in case of the G01 instruction, the function generator 204 adds the movement distance of each axis for each predetermined period of time Tcyc to the present position, and stores the result of the addition. Then, the function generator 204 transmits the movement instruction for the definite period of time Tcyc to the servo drive unit 205 (Step S87), and ends the processing for each fixed time Tcyc (Step S80).

Figure 4:
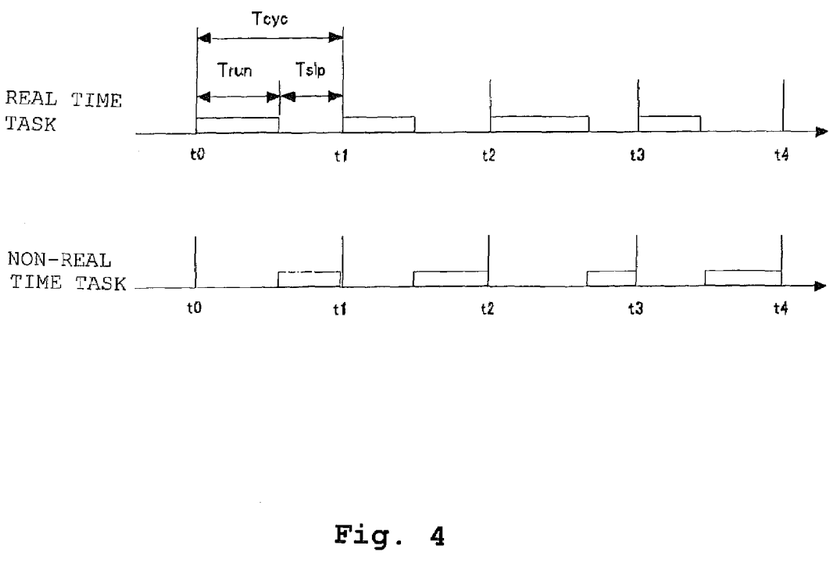
FIG. 4 is a timing chart illustrating the states of execution of tasks in the embodiment according to the present invention.

The program interpreting unit 203 and the function generator 204 are realized as a number of tasks controlled by the real time OS on the computer system as shown in FIG. 5, as mentioned above. The function generator 204 is processed as a real time task which is started at every predetermined period of time Tcyc, and the program interpreting unit 203 is processed as a non-real time task. FIG. 4 is a timing chart illustrating the state of the execution of these tasks. The abscissa axes indicate time, and a state in which each task uses the CPU 101 is shown as a rectangle. The real time task is started at each predetermined period of time Tcyc, and the processing thereof is performed. The non-real time task has a lower priority in comparison with the real time task, and the processing of the non-real time task is performed at a time when the real time task does not use the CPU 101.

Figure 9:
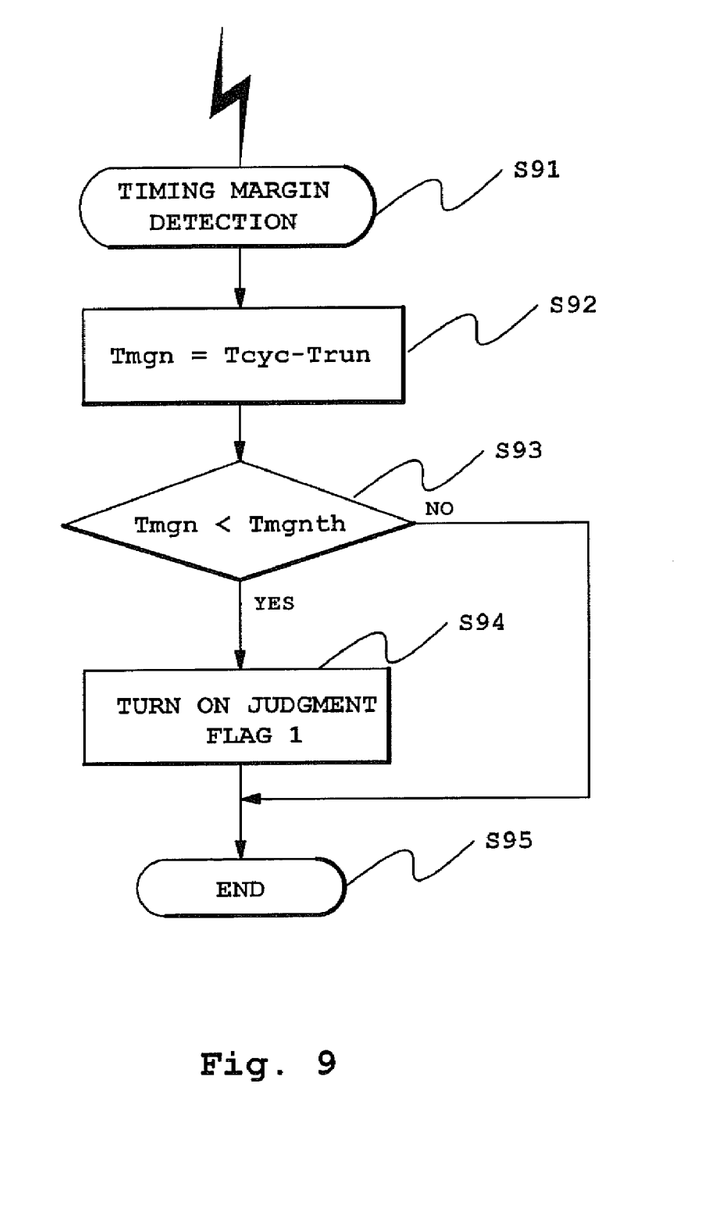
FIG. 9 is a flowchart showing the operation of a timing margin detecting unit in the embodiment according to the present invention.

Here, the real time task is started at each predetermined period of time Tcyc. During timing t0 and t1, an operation time is Trun, and a non-operation time is Tslp (=Tcyc−Trun). The operation time Trun of the real time task must not exceed the predetermined period of time Tcyc, which is the start-up repetition interval. Here, the non-operation time Tslp is a timing margin Tmgn, which is a margin of the real time task. When the timing margin is not enough, the possibility of the operation time Trun of the real time task exceeding the definite period of time Tcyc increases. That is, the possibility that the normal function generation cannot be continued increases, and such a situation cannot be said to be safe. Accordingly, the real time task is repeatedly operated for a predetermined time, and the timing margin Tmgn is measured. Then, it is judged whether or not there is a case where the timing margin Tmgn is below a predetermined value, namely a timing margin threshold value Tmgnth, in all of the started real time tasks. This is one of judgments at Step S7 in the verification of a software object, which will be described later with reference to FIG. 2. The flowchart of FIG. 9 illustrates the operation. The timing margin detecting unit 212 is started at each definite period of time Tcyc like the function generator 204 (Step S91), and the timing margin detecting unit 212 calculates the timing margin Tmgn at timing t (Step S92). When the calculated timing margin Tmgn is below the timing margin threshold value Tmgnth, the timing margin detecting unit 212 turns on a judgment flag 1 (Steps S93 and S94), and records the occurrence of the timing margin being below the threshold value.

Figure 10:
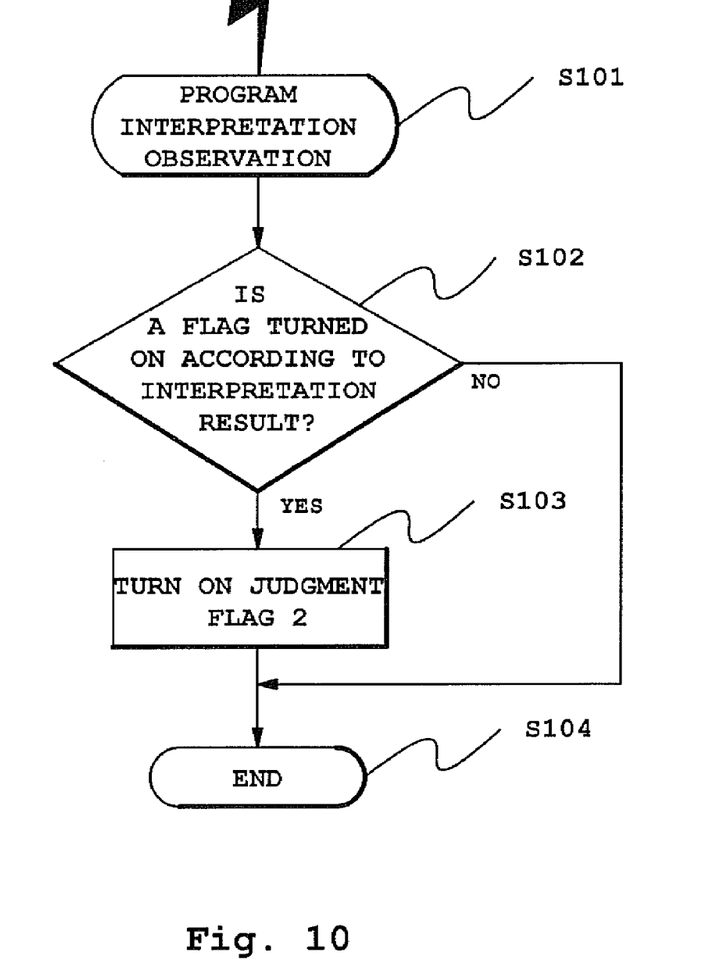
FIG. 10 is a flowchart showing the operation of a program interpretation observing unit in the embodiment according to the present invention.

On the other hand, the program interpreting unit 203 is processed by the non-real time task. As described above, the processing of the program interpreting unit 203 is performed at a time when the function generator 204, which is processed as the real time task, does not use the CPU 101. Consequently, when the processing of the program interpreting unit 203 takes time, the transmission of the interpretation result of the program interpretation performed at Step S75 in the program interpretation processing (FIG. 7) becomes too late for the timing of the existence judgment of the interpretation result of the function generator 204 (Step S83). As a result, the transmission of the movement instruction to the servo drive unit 205 (Step S87) is not performed, and then the operation of the servo motor 206 becomes less smooth to deteriorate the grade of the processing object material of a machine tool as a result. Such a problem is caused by the occupation of the CPU 101 by the low priority non-real time task realizing the program interpreting unit 203. And the use of the CPU 101 for real time task is insufficiently allocated. The lateness of the transmission of the interpretation result can be judged by judging whether a flag is turned on or not according to the interpretation result at Step S89 (FIG. 8). This is also one of the judgments of Step S7 in the verification of the software object (FIG. 2), which will be described later. The flowchart of FIG. 10 describes the operation. The program interpretation observing unit 213 is started at each predetermined period of time Tcyc like the function generator 204 (Step S101), and turns on a judgment flag 2 when a flag is turned on according to the interpretation result (Step S103). As a result, the occurrence of the late of transmission of an interpretation result of the program interpreting unit 203 to the timing of the existence judgment of the interpretation result of the function generator 204 is recorded.

Incidentally, it is better to apply as heavy a load as possible to the numerically controlled apparatus when performing these evaluations. For example, like the part program for performing mold die machining, a heavy load of executing hundreds of blocks of program interpretation per second to generate functions is better. That is, both of the program interpreting unit 203 and the function generator 204 perform evaluations using a part program by which the amount of use of the CPU 101, i.e. the load of the CPU 101, becomes maximum.

In the above, the means for evaluating the control in the real time control apparatus, or the numerically controlled apparatus, has been described.

Figure 2:
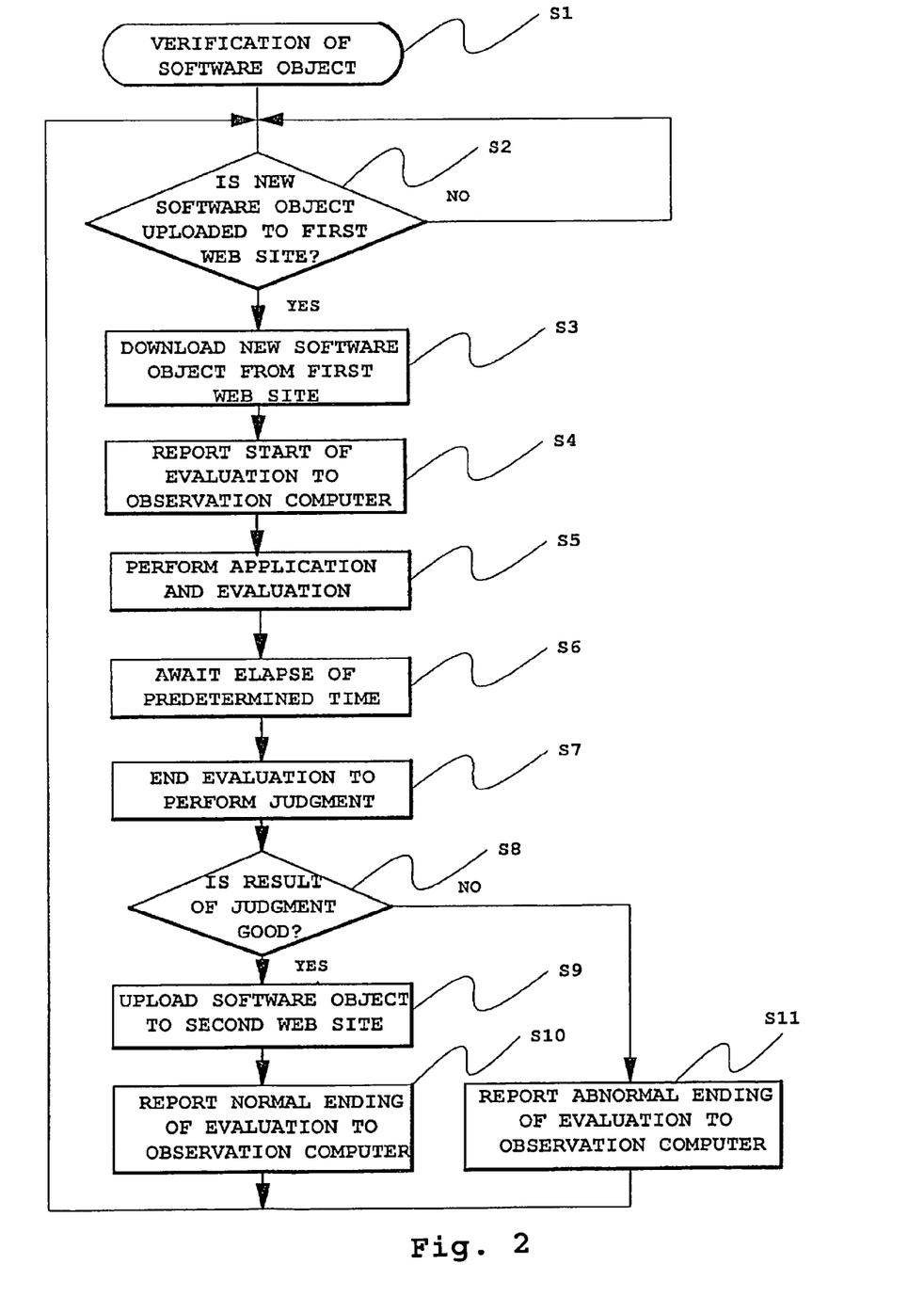
FIG. 2 is a flowchart showing a verification procedure of a software object in the embodiment according to the present invention.

Next, the verification procedure of a software object is described using the flowchart of FIG. 2.

In the verifying real time control apparatus 3, or the numerically controlled apparatus in the configuration diagram of FIG. 6, the software object verification control unit 211 takes charge of the verification of a software object. When the verification of the software object is started (Step S1), the software object verification control unit 211 judges whether a new software object is uploaded to the first web site 1 (Step S2).

Next, when there is an uploaded new software object, the software object verification control unit 211 downloads the new software object from the first web site 1 (Step S3), and reports a start of an evaluation to the observation computer 4 (Step S4). Then, the software object verification control unit 211 applies the new software object, and starts the evaluation thereof (Step S5). Here, the application of the software object and the start of the evaluation mean that the CPU 101 executes a program based on the downloaded software object by storing the downloaded software object in the hard disk 104 and by re-starting the program which is loaded on the RAM 103 to be executed. Next, the software object verification control unit 211 awaits the elapse of a predetermined time during the execution of the program (Step S6), and performs the two evaluations, which has been described before, during the waiting. Then, when the predetermined time has elapsed, the software object verification control unit 211 ends the evaluation, and performs a judgment (Step S7). The software object verification control unit 211 judges whether the evaluation result is good or not, namely judges whether both of the judgment flags 1 and 2 are turned on or not (Step S8). When both of the judgment flags 1 and 2 are not turned on and the evaluation result is judged to be good, the software object verification control unit 211 uploads the software object to the second web site 5 (Step S9), and makes it possible for the customer's real time control apparatus 6 to download the uploaded software object. Then, the software object verification control unit 211 reports the normal ending of the evaluation to the observation computer 4 (step S10). When the judgment result is not good at Step S8, the software object verification control unit 211 reports the abnormal ending of the evaluation to the observation computer 4 (Step S11).

In the above, it has been described that the verification of the software object is performed by the software object verification control unit 211.

Figure 3:
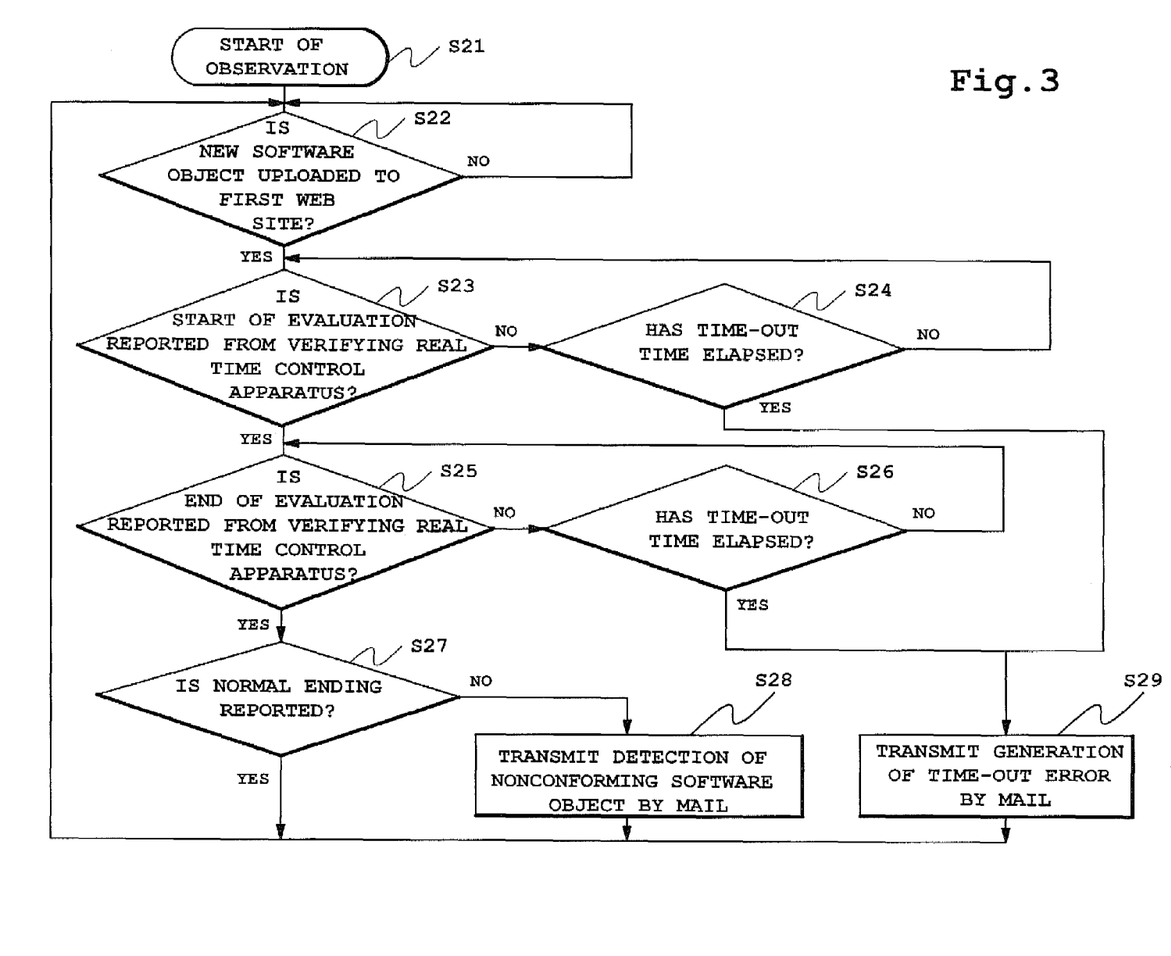
FIG. 3 is a flowchart showing an observation procedure in the embodiment according to the present invention.

Next, the procedure of the observation of the observation computer 4 pertaining to whether the verifying real time control apparatus 3 correctly performs verification or not is described based on the flowchart of FIG. 3.

When the observation computer 4 starts the observation (Step S21), the observation computer 4 waits for the uploading of a new software object to the first web site 1 (Step S22, this step flow is omitted in FIG. 1). When the new software object is uploaded in the first web site 1, the observation computer 4 awaits a report of the start of an evaluation from the verifying real time control apparatus 3 (Step S23). When there are no reports, the observation computer 4 judges whether a time-out time has elapsed or not (Step S24). When the start of the evaluation is reported at Step S23, the observation computer 4 next awaits a report of the end of the evaluation from the verifying real time control apparatus 3 (Step S25). When there are no reports at Step S25, the observation computer 4 judges whether the time-out time has elapsed or not (Step S26).

When there is the report of a normal ending (Step S27), the processing of the observation computer 4 returns to Step S22 to await the uploading of a new software object to the first web site 1. When it is judged at Step S27 that the ending is not normal, the observation computer 4 transmits mail informing the manager's computer 7 of the detection of a nonconforming software object (Step S28).

When there are no reports of the starting or the ending of the evaluation from the verifying real time control apparatus 3 and the time-out time has elapsed at Steps S24 and S26, the observation computer 4 transmits the mail informing the manager's computer 7 of the occurrence of the time-out error (Step S29).

In the above, the procedure of the observation computer 4 for observing that the verifying real time control apparatus 3 is correctly performing the verification has been described. Incidentally, although the descriptions have been given on the supposition that the verifying real time control apparatus 3 uploads a software object to the second web site in the present embodiment, it may be assumed that the observation computer 4 uploads the software object.

Moreover, although it has been described in the above description that the software object verification control unit 211 uploads a software object to the second web site 5 at Step S9 of FIG. 2, the software object verification control unit 211 may upload a judgment result to the second web site 5. In this case, the customer's real time control apparatus 6 may download a software object from the first web site 1 based on the judgment result uploaded to the second web site 5. Alternatively, a configuration of enabling the copying of the software object from the first web site 1 to the second web site 5 and of enabling the customer's real time control apparatus 6 to download the software object from the second web site 5 based on the judgment result uploaded to the second web site 5 may be adopted.

Moreover, although it is described in the above description that the first web site 1 and the second web site 5 are different from each other, they may be the same web site. Here, a web site may be a site configured to be able to download a software object through the Internet, and consequently the web site is not limited to one using a Hyper Text Transfer Protocol (HTTP). Consequently, the web site may be one configured to be able to perform download by a communication protocol such as a file transfer protocol (FTP).

What is claimed is:

1. A computer-implemented method for verifying an effect of a software object on real time control before applying the software object to a customer's real-time control apparatus, comprising the steps of:
   downloading the software object from a first web site to a verifying real time control apparatus realized by a computer system for performing the real time control;
   applying the software object to the verifying real time control apparatus;
   evaluating whether the verifying real time control apparatus stably maintains the real time control or not even after the software object is applied to the verifying real time control apparatus by evaluating that a time margin of a real time task operating in the verifying real time control apparatus is not below a predetermined value in a state in which the software object is applied under a predetermined load being imposed on the verifying real time control apparatus to be operated for a predetermined time;
   uploading the software object which has been evaluated as one capable of maintaining a stability to a second web site; and
   the customer's real time control apparatus downloading the software object from the second web site to enable the software object to be applied, wherein the software object includes at least one of virus detecting software, a detection pattern file, and anti-virus software, for protection against computer viruses.

2. The method according to claim 1, wherein
   an observation computer observes the verifying real time control apparatus, and, when the verifying real time control apparatus is disabled and cannot output any evaluation results, the observation computer reports this situation to a manager terminal at each of the steps of:
   downloading the software object from the first web site to the verifying real time control apparatus;
   applying the software object to the verifying real time control apparatus;
   evaluating whether the verifying real time control apparatus stably maintains the real time control or not even after the software object is applied to the verifying real time control apparatus; and
   uploading the software object after the evaluation to a second web site.

3. The method according to claim 2, wherein the software object is software for updating basic software.

4. The method according to claim 1, wherein the verifying real time control apparatus is a numerically controlled apparatus, further comprising the step of:
   evaluating that program interpretation is performed to be in time for function generation in a state in which a predetermined part program is interpreted and is executed by the numerically controlled apparatus.

5. The method according to claim 4, wherein the software object is software for updating basic software.

6. The method according to claim 1, wherein the software object is software for updating basic software.

7. A computer-implemented method for verifying an influence of a software object to real time control before applying the software object to a customer's real-time control apparatus, comprising the steps of:
   downloading the software object from a first web site to a verifying real time control apparatus realized by a computer system for performing the real time control;
   applying the software object to the verifying real time control apparatus;

evaluating whether the verifying real time control apparatus stably maintains the real time control or not even after the software object is applied to the verifying real time control apparatus by evaluating that a time margin of a real time task operating in the verifying real time control apparatus is not below a predetermined value in a state in which the software object is applied under a predetermined load being imposed on the verifying real time control apparatus to be operated for a predetermined time;

uploading a result of the evaluation to a second web site; and the customer's real time control apparatus enabling the software object to be applied based on the result of the evaluation uploaded to the second web site, wherein the software object includes at least one of virus detecting software, a detection pattern file, and anti-virus software, for protection against computer viruses.

8. The method according to claim 7, wherein an observation computer observes the verifying real time control apparatus, and, when the verifying real time control apparatus is disabled and cannot output any evaluation results, the observation computer reports this situation to a manager terminal at each of the steps of:

downloading the software object from the first web site to the verifying real time control apparatus;

applying the software object to the verifying real time control apparatus;

evaluating whether the verifying real time control apparatus stably maintains the real time control or not even after the software object is applied to the verifying real time control apparatus; and uploading a result of the evaluation to a second web site.

9. The method according to claim 8, wherein the software object is software for updating basic software.

10. The method according to claim 7, wherein the verifying real time control apparatus is a numerically controlled apparatus, further comprising the step of:

evaluating that program interpretation is performed to be in time for function generation in a state in which a predetermined part program is interpreted and is executed by the numerically controlled apparatus.

11. The method according to claim 10, wherein the software object is software for updating basic software.

12. The method according to claim 7, wherein the software object is software for updating basic software.

* * * * *